V. E. FREEMAN.
PNEUMATIC TIRE.
APPLICATION FILED NOV. 12, 1912.
1,117,994.
Patented Nov. 24, 1914.
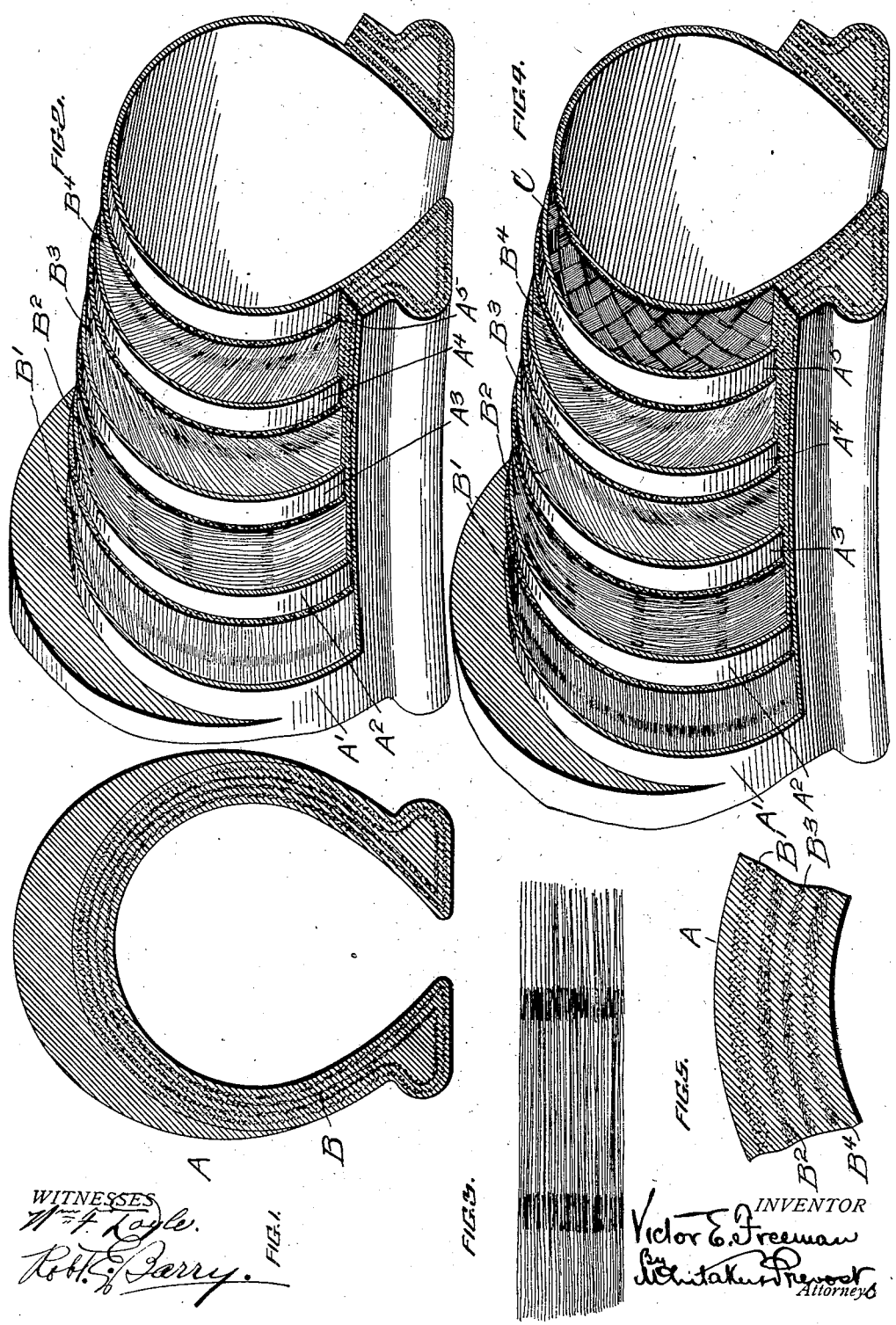
INVENTOR
Victor E. Freeman

UNITED STATES PATENT OFFICE.

VICTOR E. FREEMAN, OF NEW YORK, N. Y.

PNEUMATIC TIRE.

1,117,994.     Specification of Letters Patent.     Patented Nov. 24, 1914.

Application filed November 12, 1912. Serial No. 730,903.

*To all whom it may concern:*

Be it known that I, VICTOR E. FREEMAN, citizen of the United States, residing at New York, in the county of New York and State of New York, have invented certain new and useful Improvements in Pneumatic Tires; and I do hereby declare the following to be a full, clear, and exact description of the invention, such as will enable others skilled in the art to which it appertains to make and use the same.

My invention consists in the novel features hereinafter described reference being had to the accompanying drawing which shows one embodiment of my invention which I have selected for purposes of illustration, and said invention is fully disclosed in the following description and claims.

The object of my invention is to produce a pneumatic tire and particularly a shoe, or in other words, the external portion of the tire which comes into direct engagement with the ground, which shall be more perfectly resilient, and less liable to injury by puncture or contact with obstructions in the road bed, and it consists primarily in a tire wall comprising a homogeneous mass of rubber in which are embodied successive layers or strata of natural, untwisted unspun fibers, each fiber being held in place independently of the others by the adhesion of the surrounding portions of the rubber, and the fibers of one stratum, or layer extending in a different direction from the fibers of adjacent layers or strata, all the fibers of any particular stratum extending in the same direction.

My invention also contemplates the use in connection with such form of tire wall of a reinforcing layer of non-elastic fabric for withstanding the internal form of pressure and also the use in connection with this type of tire wall of a reinforcing layer formed of pieces of narrow non-elastic fabric extending diagonally around the tire and interlaced or interwoven in the form of a basket weave.

Referring to the said drawings, Figure 1 represents a sectional view of a portion of a tire embodying my invention. Fig. 2 is a detail perspective view illustrating generally the manner of building up the tire previous to vulcanization. Fig. 3 is a plan view of a sheet or layer of fibers as they appear prior to being embodied in the plastic. Fig. 4 is a view similar to Fig. 2, of a modification. Fig. 5 is an enlarged sectional view of a portion of the tire wall.

In the manufacture of pneumatic tires, and shoes for the same, it is customary to build up a composite structure comprising alternate layers of rubber and of canvas or similar fabric, and to then vulcanize the whole to form the composite tire wall, the fabric being inserted for the purpose of strengthening the tire wall to resist internal pressure and to prevent the puncturing of the wall. In all such wall structures the inserted fabric or fabrics stiffen the wall and detract greatly from its resiliency and moreover they make a hard interior surface beneath the outer layer of rubber, so that sharp stones and the like will more readily penetrate and cut the same, by reason of the comparatively unyielding backing thereof afforded by the canvas. Moreover as the various layers of canvas and the like are merely cemented together by the intervening layers of rubber, there are always distinct lines of cleavage between the canvas and the adjacent rubber so that if a small particle of gravel, sand or stone penetrates the outer layer of rubber for example, it will work along the outer face of the next adjacent canvas layer, and tend to pry the rubber away from it frequently working a considerable distance from the point where it entered and opening up a channel for water which rots the exposed portions of the canvas and hastens the deterioration of the tire.

The object of my invention is to form a tire wall which shall be in effect a unitary rubber wall, not made up of distinct layers having lines of cleavage, but containing in the substantially integral rubber mass constituting the tire wall, soft untwisted fibers of animal, vegetable or mineral origin, disposed in the mass, in such manner that the fibers are entirely independent of each other and are held in position merely by their adhesion to the surrounding portions of the rubber, the said fibers imparting the desired strength to the tire wall to withstand internal and external pressure, but providing a wall of the maximum resiliency. By fibers I mean natural fibers of animal, vegetable or mineral origin and particularly the long fibers of silk, ramie, china grass and the like, the fibers being merely laid side by side in a flat sheet of any desired or convenient width and thickness, but not being either spun or twisted. The fibers will be so arranged with respect to each other as to afford the best reinforcing effect on the rubber wall, for example, the fibers will extend in various directions around the tubular tire wall, one set of fibers crossing another at right angles, or at any desired angle, or the fibers may extend spirally around the tire wall, and one set of spirally arranged fibers may be made to cross another set of spirally arranged fibers, and the spiral arrangement may be used in conjunction with other sets of fibers which may extend around the tubular wall parallel to the periphery and transversely thereof. With this construction the tire wall while thoroughly reinforced by the fibers lying in the same, is very soft and resilient so that in passing over a sharp stone or similar obstacle, the tire wall will yield more readily than the ordinary tire wall, and avoid in many instances cuts or injuries thereto which would occur if the stiffness of the tire wall afforded a greater resistance to the obstruction. The greater resilience of the tire wall will also contribute greatly to the cushioning action of the tire and the ease of riding.

In carrying out my invention the fibers may be handled in various ways, for example, I may build up the tire structure by using alternate layers of rubber, and the fibers, the fibers being laid upon the various layers of rubber in different directions, and the fibers of each layer may be held in place by the application of some adhesive material until the next layer of rubber can be placed around the same. I prefer to employ an adhesive compound which will either volatilize and disappear during the vulcanization of the rubber, or which will be absorbed in the rubber, as, for example, a thin rubber adhesive composition.

In some instances I may form the fibers into a flat sheet of any desired thickness in which the fibers are held together by a suitable adhesive compound, which will disappear or be absorbed by the rubber in vulcanization, and I prefer to form these sheets very thin, the fibers lying longitudinally thereof, and the sheet being of any desired width and length so that such sheets can be placed between adjacent layers of rubber in building up the tire, with the fibers running in various directions so as to thoroughly reinforce the tire wall. It will be seen that during the vulcanization the binding material releases the individual fibers, and the rubber of the various layers consolidates thus forming a plastic mass in which each individual fiber is held throughout its length by the adhesion of the rubber thereto without being connected with or interwoven with any other fiber of the same or other layer, hence there is no possibility of the fibers exerting a cutting action on each other as would be the case at intersections, if they were interwoven or connected. And further the fibers are in a state of fullest tension and hence there is no slack to be taken up before the reinforcing action of the fibers takes place, as is the case where a woven fabric or a spun or twisted thread is employed. Ramie, and china grass fibers which are over a foot in length, are specially well adapted for use in carrying out my invention. It will also be understood that in laying the fibers on, in building up the tire wall previous to vulcanization, whether the fibers are laid on and held in place by an adhesive, or are applied in the form of a previously prepared sheet, the fibers will be preferably substantially in the relation in which they are placed in ordinary sliver, that is to say with their ends overlapped, so that the ends of the fibers are interlocked to the extent that they are usually in a sliver or roving, although this is not essential to my invention. It is convenient, however, and faciliates the application of the fibers.

In the accompanying drawings I have shown in Fig. 1 in a more or less exaggerated manner, for purposes of illustration a sectional view of a tire the wall being composed of rubber A, in which are embedded the fibers B, the same lying in this case both longitudinally and transversely of the tire wall, very much as the silk fibers lie in the paper used in the manufacture of United States and bank notes except that obviously the fibers are more numerous.

In Fig. 2 I have undertaken to illustrate one method of building up the tire wall in which $A^1$, $A^2$, $A^3$, $A^4$, $A^5$ represent successive layers of rubber, between which the fibers are laid in as shown at $B^1$ $B^2$ $B^3$ $B^4$ the fibers $B^1$ lying longitudinally of the wall, $B^2$ transversely and $B^3$ $B^4$ being laid in spirally in opposite directions, I do not limit myself to the particular combination of these different arrangements of the fibers as any desirable combination may be adopted.

In Fig. 3 I have endeavored to illustrate graphically a thin sheet of fibers prepared sliver-wise, that is to say with their ends interlocked, in the manner of sliver or roving, and the fibers held temporarily in a thin sheet by a suitable adhesive. Where these fiber sheets are used I prefer to form them very thin, and pervious, that is to say, the fibers will be united by the smallest quantity of adhesive that can be used to hold them in sheet form so that the sheet will actually be pervious, and thus facilitate the union of the adjacent rubber layers through the same. This, however, is not essential as the adhesive material will be absorbed into the rubber or disappear, so that in any case the rubber of adjacent layers unites and surrounds the individual interposed fibers. It is to be understood that my invention provides a tire wall so soft and flexible that it can be used for the inner tubes of pneumatic tires, and for single tube tires, and for the outer tube or shoe of double tube and clencher tires. In some cases I may employ in addition to the preferred fibers hereinbefore referred to animal fibers, as wool, or hair, and mineral fibers, as asbestos and like minerals.

In Fig. 4 I have shown a modification of my invention, in which I employ a narrow band or ribbon of woven fabric adjacent to the inner surface of the tire wall to reinforce the structure to withstand the internal air pressure, without decreasing the resiliency of the tire wall to any appreciable extent. For this purpose I prefer to use a narrow woven band having a selvage at each edge, which is carried around the tubular wall diagonally and interlaced in such manner as to make what may be termed a "basket weave" as shown in Fig. 4 in which C, C represent the interlaced or braided strips of fabric. This braided tubular reinforce is preferably placed upon the innermost layer of rubber and the layers of fibers alternating with layers of rubber are placed upon it as previously described, and as shown in Fig. 4. This is my preferred construction where the reinforcing bands are employed but they may be used between adjacent layers of fibers, thereby bringing them nearer to the center of the tube wall, if desired. By carrying the bands C around the tubular tire structure diagonally and interlacing them, a great number of short spans of the fabric are provided to resist the internal pressure of the compressed air in the tire, and relieve the portions in which the fibers are incorporated from internal strain to a considerable extent, or entirely. The tire illustrated in Fig. 4 is vulcanized in the usual manner to unite all the material in the rubber, and form a solid wall.

I am aware that it has been proposed to form a tire by winding spun and twisted threads in various ways around the tire wall, between adjacent layers of rubber, and this I do not desire to claim. Such a construction presents all the disadvantages of the use of textile fabrics, with perhaps an additional disadvantage, to wit; that the twisted and spun cords or threads are likely to cut the contiguous rubber when subjected to strain. Such threads being spun or twisted are hard and wiry and tend to become more so, and with the great pressure to which they are subjected between the internal air pressure and the hard road bed, they tend to cut and wear the rubber and to detach themselves therefrom, which is not the case with the described fibers. They also form layers, presenting substantially the same stratification that is found where alternate layers of canvas and rubber are used and making it possible for a particle of gravel, sand or stone to work along the threads and separate the adjacent portions of the rubber layer from the layer of thread, which is impossible in a tire embodying my invention.

What I claim and desire to secure by Letters Patent is:—

1. A pneumatic tire having its walls comprising a homogeneous mass of vulcanized rubber in which are embodied sheets of natural, unspun fibers located at intervals in the rubber mass between the inner and outer faces of the tire wall, the fibers of each sheet being parallel with each other and extending in a different direction from the fibers of adjacent sheets, the vulcanized rubber mass being integral and extending through the several fiber sheets between adjacent fibers thereof.

2. A pneumatic tire having its walls comprising a homogeneous mass of rubber in which are embodied sheets of natural unspun fibers located at intervals in the rubber mass between the inner and outer faces of the tire wall, the fibers of each sheet being parallel with each other and extending in a different direction from the fibers in others of said fiber sheets, and a layer of non-elastic material for assisting in preventing the distention of the tire by internal pressure, without materially affecting the resiliency of the tire wall.

3. A pneumatic tire having its walls comprising a homogeneous mass of rubber in which are embodied sheets of natural unspun fibers, located at intervals in the rubber mass between the inner and outer faces of the tire wall, the fibers of each sheet being parallel with each other, and extending in a different direction from the fibers of adjacent sheets, and a reinforcing sheet of non-elastic fabric located in the tire wall for preventing the distention of said wall by the internal pressure thereon.

In testimony whereof I affix my signature, in the presence of two witnesses.

VICTOR E. FREEMAN.

Witnesses:
  L. P. WHITAKER,
  E. W. WYATT.